(12) United States Patent
Landells et al.

(10) Patent No.: US 8,121,817 B2
(45) Date of Patent: Feb. 21, 2012

(54) ABNORMAL EVENT DETECTION USING PRINCIPAL COMPONENT ANALYSIS

(75) Inventors: Keith Landells, Upper Basildon (GB); Zaid Rawi, London (GB)

(73) Assignee: BP Oil International Limited, Middlesex (GB)

( * ) Notice: Subject to any disclaimer, the term of this patent is extended or adjusted under 35 U.S.C. 154(b) by 319 days.

(21) Appl. No.: 12/311,785

(22) PCT Filed: Oct. 16, 2007

(86) PCT No.: PCT/GB2007/003934
§ 371 (c)(1),
(2), (4) Date: Apr. 13, 2009

(87) PCT Pub. No.: WO2008/047098
PCT Pub. Date: Apr. 24, 2008

(65) Prior Publication Data
US 2010/0036529 A1    Feb. 11, 2010

(30) Foreign Application Priority Data

Oct. 18, 2006 (EP) ................................. 06255365

(51) Int. Cl.
*G05B 13/04* (2006.01)
(52) U.S. Cl. ........ 702/182; 702/183; 702/184; 702/185; 702/188; 700/28; 700/29; 700/30; 700/44; 700/45; 700/47; 700/48; 700/50; 700/51; 700/52; 700/53; 706/15; 706/16; 706/21; 706/23; 706/26; 706/31

(58) Field of Classification Search .......... 702/182–185, 702/188; 700/28, 29, 30, 44, 45, 47, 48, 700/50–53; 706/15, 16, 21, 23, 26, 31
See application file for complete search history.

(56) References Cited

U.S. PATENT DOCUMENTS

| 4,349,869 | A | 9/1982 | Prett et al. |
| 5,949,678 | A | 9/1999 | Wold et al. |
| 2002/0087221 | A1* | 7/2002 | Keeler et al. ................ 700/48 |
| 2006/0074598 | A1 | 4/2006 | Emigholz et al. |

OTHER PUBLICATIONS

International Search Report for PCT/GB2007/003934, mailed Dec. 11, 2007.
Written Opinion of the International Searching Authority for PCT/GB2007/003934, mailed Dec. 11, 2007.

(Continued)

*Primary Examiner* — Sujoy Kundu
(74) *Attorney, Agent, or Firm* — Nixon & Vanderhye

(57) ABSTRACT

Process control system for detecting abnormal events in a process having one or more independent variables and one or more dependent variables. The system includes a device for measuring values of the one or more independent and dependent variables, a process controller having a predictive model for calculating predicted values of the one or more dependent variables from the measured values of the one or more independent variables, a calculator for calculating residual values for the one or more dependent variables from the difference between the predicted and measured values of the one or more dependent variables, and an analyzer for performing a principal component analysis on the residual values. The process controller is a multivariable predictive control means and the principal component analysis results in the output of one or more scores values, T2 values and Q values.

15 Claims, 4 Drawing Sheets

OTHER PUBLICATIONS

MacGregor, J.F. et al., "Data-Based Latent Variable Methods for Process and Analysis, Monitoring and Control", Computers & Chemical Engineering, vol. 29, No. 6, (May 15, 2005), pp. 1217-1223.

Zhang, E., "Application of Model-Based Principal Component Analysis and Golden Batch to Bioreactor Monitoring and Control", [Online], (Feb. 2006), Chemical Engineering Department, Univ. of Texas, 16 pages.

Wachs A. et al., "Process Monitoring Using Model-Based PCA", IFAC Symposium on Dynamics and Control of Process Systems, vol. 1, (1999), pp. 87-92.

Martin, E.B. et al., "Process Performance Monitoring Using Multivariate Statistical Process Control", IEE Proceedings D Control Theory & Applications, vol. 143, No. 2, (Mar. 25, 1996), pp. 132-144.

Yang, Y. et al., "A New Fault Detection and Diagnosis Method Based on Principal Component Analysis in Multivarlate Continuous Processes", Intelligent Control and Automation, vol. 4, (Jun. 10, 2002), pp. 3156-3160.

Cinar, A. et al., "Statistical Process and Controller Performance Monitoring. A Tutorial on Current Methods and Future Directions", American Control Conference, 1999, vol. 4, (Jun. 2, 1999), pp. 2625-2639.

* cited by examiner

ABNORMAL EVENT DETECTION USING PRINCIPAL COMPONENT ANALYSIS

This application is the U.S. national phase of International Application No. PCT/GB2007/003934, filed 16 Oct. 2007, which designated the U.S. and claims priority to Europe Application No. 06255365.6, filed 18 Oct. 2006, the entire contents of each of which are hereby incorporated by reference.

This invention relates to the field of abnormal event detection, specifically to the use of multivariate statistical methods in detecting abnormal events in a process.

BACKGROUND OF THE INVENTION

In petrochemicals and refinery processes the rapid and efficient detection of deviations from normal or ideal operation is important in maintaining production efficiency. In a typical process, alarm points are typically set for important operating parameters, such as temperatures, pressures and flow rates in various parts of the process, which alarm points can suitably be displayed on a control unit monitor. The alarm points may be used to alert an operator through a visual and/or audible signal so that manual intervention, if necessary, can be taken.

Often, methods of fault detection are univariate in nature, in which each process variable is analysed and controlled independently. However, Martin et al, in EE Proc.-Control Theory Appl., 143(2), pp 132-144 (1996), describe the use of multivariate statistical methods in detecting abnormal events in a process. In one example, predicted values of dependent variables of a process can be obtained by performing partial least squares (PLS) analysis based on the values of independent variables. Differences between the predicted values from the PLS analysis and the measured dependent variable values are then used to highlight any deviations from expected or optimal behaviour.

It has also been disclosed by Wachs and Lewin in Dynamics and Control of Process Systems, 1998 Vol. 1, pp 87-92 (Oxford) that performing principal component analysis on the residual values between a first principles model and a simulated process, i.e. the differences between the predicted and calculated values of the dependent variables, can provide an accurate means of identifying any deviations from expected or optimal behaviour, and also which variables are involved in the deviation.

A problem with such methods, however, is that both a historical database of process data and a model developed from first principles are required for predictive analysis, which are time consuming and costly to develop and implement.

SUMMARY OF THE INVENTION

According to a first aspect of the present invention, there is provided a process control system for detecting abnormal events in a process having one or more independent variables and one or more dependent variables, which system comprises means for measuring values of the one or more independent and dependent variables, a process control means comprising a predictive model for calculating predicted values of the one or more dependent variables from the measured values of the one or more independent variables, a means of calculating residual values for the one or more dependent variables from the difference between the predicted and measured values of the one or more dependent variables, and a means for performing a principal component analysis on the residual values, characterised in that the process control means is a multivariable predictive control means.

According to a second aspect of the present invention, there is provided a method for detecting abnormal events in a process, which process comprises one or more independent variables and one or more dependent variables, means for measuring values of the one or more independent and dependent variables, and a process control means comprising a predictive model for calculating predicted values of the one or more dependent variables from the measured values of the one or more independent variables, which method comprises measuring values of the one or more independent variables and the one or more dependent variables, calculating predicted values of the one or more dependent variables from the measured values of the one or more independent variables, calculating residual values for the one or more dependent variables from the differences between the predicted and measured values of the one or more dependent variables, and performing a principal components analysis on the residual values, characterised in that the process control means is a multivariable predictive control means.

The multivariable predictive control (MPC) means has a predictive model, which is capable of predicting values of the one or more dependent variables from the measured values of the one or more independent variables. It can control a process in a feed-forward capacity, by altering independent variables to arrive at desired dependent variable values. The predictive model may additionally be associated with assigned upper and lower limits of independent and dependent variables to ensure the process operates within a desired, pre-determined operating envelope. These limits are typically within any trip or alarm limits that may already be associated with the process control means. Typically a linear programming optimisation technique is used to determine which independent variable(s) to vary, and to what extent, in order to maintain the process within the pre-determined envelope.

An advantage of using an MPC predictive model is that the detection of abnormal events can be based on an existing model, based on the plant operation, rather than having to develop and create a model from first principles, for example by collating and analysing a large amount of historically collected process data.

Another advantage of an MPC predictive model is that it can be transferred. For example, where the process is the distillation of crude oil, a predictive model developed for one crude oil distillation unit can be transferred to a separate but similar crude distillation unit which also employs a MPC means. This saves a substantial amount of time during starting up or commissioning, as it takes less time to adapt an existing model for a new unit than to build a completely new model.

An example of a MPC means is a Dynamic Matrix Control (DMC) system, an example of which is described in U.S. Pat. No. 4,349,869. Models generated by DMC systems are continually adapted and updated during normal operation of the process, in which perturbations are deliberately introduced into the process by varying one or more of the independent variables during operation, and measuring the effects on the one or more dependent variables. The effects on the dependent variables are measured, and the predictive model updated and adapted accordingly. This can be advantageous as the predicted values of the dependent variables of the process are based on recent operating data, and can circumvent the need for manual maintenance of the predictive models.

A further correction can be applied to the predicted values of the dependent variables or the residual values to remove effects resulting from discrepancies or mismatch between the dependent variable values calculated by the predictive model, and the actually measured dependent variables during normal operation in the absence of any abnormal event. This can be achieved using, for example, a neural network or by applying techniques such as non-linear partial least squares analysis or dynamic canonical correlation analysis. By accounting for such a mismatch, the probability of false detection of abnormal events is reduced.

Often, processes can have more than one stable mode of operation, and these can be very different depending on the nature of operation. For example, when a process is started up after a shut-down, one type of operating mode is experienced. During stable operation, a different operating mode may be experienced. Additionally, after lengthy operation for example, catalyst deactivation may require that harsher operating conditions are required, such that yet another operating mode is experienced. Therefore, a process may have more than one predictive model for different modes of operation, the appropriate model either being selected manually by an operator, or being automatically selected based on predetermined values for one or more of the process parameters that may include one or more of the independent or dependent variables.

Independent variables are those which can be manipulated or varied, such as valve controller outputs or controller set points, which will affect other variables, i.e. the dependent variables. Independent variables also encompass disturbance variables which cannot be controlled, such as ambient temperature and pressure. Dependent variables are typically those that are not easily measured or directly controlled, but which are impacted by variations in the independent variables, an example being composition of a process stream.

In the present invention, abnormal events are predicted by performing principal component analysis (PCA) on the residual values of the one or more dependent variables (i.e. the difference between the calculated and measured values of the one or more dependent variables).

The PCA analysis of the residuals provides a rapid means for identifying not only any deviations from expected or optimal behaviour, but also a rapid means of determining which variables are responsible for the deviations. Performing PCA analysis of the residual values is advantageous over analysing the residual values for each variable separately because, by encompassing relationships between variables or residuals, it is more sensitive to fault detection. This ensures a more rapid and accurate detection of any outliers which can result, for example, by an unexpected or abnormal event. It also allows a more rapid and accurate analysis and identification of the variables associated with such an event.

In the method of the present invention, values for each of the independent and dependent variables are measured. In addition, predicted values of the one or more dependent variables are calculated by the predictive model of the MPC means from the values of the one or more measured independent variables.

Principal component analysis comprises extracting a set of orthogonal, independent axes (principal components) that are linear combinations of the variables of the data set, and which are extracted or calculated such that the maximum extent of variance within the data is encompassed by as few principal components as possible. The first principal component is calculated to account for the greatest variance in the data, the second principal component is then calculated to account for the greatest variance in the data orthogonal to the first principal component, the third to account for the greatest variance in the data orthogonal to the first two principal components, and so on. For each principal component extracted, less and less variance is accounted for. Eventually, the extraction of further principal components no longer accounts for significant additional variance within the data. By such means, a multi-dimensional (multi-variable) data set can be reduced to fewer dimensions (principal components), while still retaining as much useful information within the data as possible, which greatly simplifies analysis of the process data, and the detection of any abnormal events.

A data set used in a principal component analysis typically comprises a number of data points with a value for each of the one or more variables in question. The different data points may be collected at different time periods, as could occur for example in a chemicals or refinery process. In the present invention, the relevant value for each variable in the PCA is the difference between the predicted and measured value for each dependent variable. Typically, the data are first scaled, for example by autoscaling or means-centering techniques. A set of orthogonal principal components are then extracted so that as few principle components as possible are extracted from the data, while accounting for as much variance as possible.

The position of a data point along a given principal component is referred to as its "score". The weighting of a variable for a given principal component is referred to as its "loading". The scores are analysed to detect abnormal events. Loadings can be used to establish the variables associated with an abnormal event.

The PCA is typically performed using a suitably programmed computer. In one embodiment, the computer is able to receive the values of the measured and predicted values of the one or more dependent variables, typically from the process control means. The residuals are calculated, and the PCA performed on the data set comprising the residual values of the one or more dependent variables. Where non-linear optimisation and/or corrections are applied to the predicted values of the one or more dependent variables and/or residuals data, this can be carried out using the same computer as that used for the PCA, using either a separate programme, or using suitably adapted PCA software with capability for applying such optimisations and/or corrections.

In one embodiment of the present invention, the data set used for the PCA comprises a collection of residuals data points obtained during normal process operation, and an additional data point based on the latest residual values collected from the process. In an alternative embodiment, the data set comprises values for the latest data point collected from the process, together with a pre-determined number of previously collected data points. By using a data set comprising a number of data points collected in a pre-determined time prior to the latest data point, as opposed to using a single, static predetermined set of data points, then an evolving comparison of data points arising from the principal component analysis is achieved, which continually adapts to gradually changing situations such as catalyst deactivation and feedstock changes.

Abnormal events can be identified from the data resulting from the PCA of the residuals. There are a number of ways in which this may be achieved. In one embodiment, a confidence interval is calculated based on the scores values for a pre-determined number of principal components, for example the first two principal components, although the principles apply to the use of more than two principal components. The confidence level can be defined based on a percentage of the data points from the data set that fall within the pre-determined confidence interval for each principal component. The pre-determined percentage of data points is typically a value in the range of from 90 to 99%, for example 95% of the data points. Thus, for a 95% confidence interval, 95% of the data points in the data set fall within the threshold range for each of the two principal components. The shape of the confidence interval is typically elliptical. If the latest collected data point falls outside the confidence interval, often referred to as an outlier, then this is an indication that unusual or an abnormal event may be occurring.

In another embodiment of the invention, a $T^2$ value for each data point is calculated. A $T^2$ value is often called a Hotelling's $T^2$ statistic, and defines the distance of a data point from an origin, for example the distance of the data point from the intersection (origin) of two or more principal components. Comparing the $T^2$ value to a pre-determined threshold, for example as defined by an elliptical confidence interval, provides an indication of whether an abnormal event has or is occurring.

In yet another embodiment of the invention, a so-called Q metric is calculated for each data point. The Q metric represents the quantity of variance in the data that is not expressed by a pre-determined number of principal components. If the value increases, it signifies a change in the process compared to the model, which indicates a deviation from normal or expected behaviour.

Any one or more techniques can be used individually or in combination in order to determine the occurrence of an abnormal event.

Detection of abnormal events may be manual. In one embodiment, a display screen in a control room provides a user with one or more of a principal components scores plot, a $T^2$ plot, and a Q-metric plot, where an indication of the confidence interval is used to alert a user to the onset of an abnormal event. When a data point is shown to deviate outside the confidence interval, then examination of the scores values and variable contributions associated therewith can be used to determine the cause of the deviation. By providing a rapid means of detecting when an abnormal event is taking place (for example from one or more of the scores values of the residuals PCA data, the $T^2$ values, and the Q-metric), then an operator can quickly determine the causes of any deviation and assess if a manual intervention to the process is required.

Alternatively, the analysis and abnormal event detection can be performed automatically, for example using a suitably programmed computer, which can calculate whether a data point falls outside the confidence interval on the basis of, for example, one or more of the PCA scores values, the $T^2$ values or the Q-metric, and identify which variables need to be altered (if any) in order to rectify the cause of the abnormal event. This information can be fed as output to the process control means, which can alter one or more of the independent variables accordingly to remove the cause of the abnormal event.

Principal component scores plots are conveniently plotted in two or three dimensions against two or three orthogonally arranged principal components. Alternatively, scores values for a plurality of principal components can be simultaneously displayed on a screen using parallel coordinates or using a radar graph or plot. Such arrangements can be particularly useful where more than three principal components are required to account for a sufficient percentage of the variance within the data set. By displaying the data in such a form, abnormal events can be more easily detected by an operator, allowing earlier intervention to rectify an abnormal event if required.

In one embodiment of the invention, Q and $T^2$ contributions plots associated with a data point identifying an abnormal event is compared to a database of previously known abnormal events, for example through pattern recognition or correlation techniques. This provides a rapid and facile method of identifying the onset of known abnormal events for which mitigating actions are already known. Corrective action may be carried out manually by an operator. Alternatively, this can be done automatically, such that recognition of an abnormal event provides the process control means with corrective action necessary to maintain optimal operation.

The process to which the method of the present invention is applied is suitably a refinery process or a chemicals production process. The method can be used for the process as a whole, or a smaller constituent part of the process. For example, in the refining of crude oil to produce various hydrocarbon fuels, such as gasoline, diesel, heating fuel, jet fuel and the like, the method can be applied to the whole refinery, or alternatively to one or more individual refinery units, such as a crude distillation unit, a fluid catalytic cracker, a hydrotreater, a hydrocracker, an isomerisation unit, a reformer and the like.

BRIEF DESCRIPTION OF THE DRAWINGS

The process will now be illustrated with reference to the Figures in which.

DETAILED DESCRIPTION OF PREFERRED EMBODIMENTS

Figure 1:
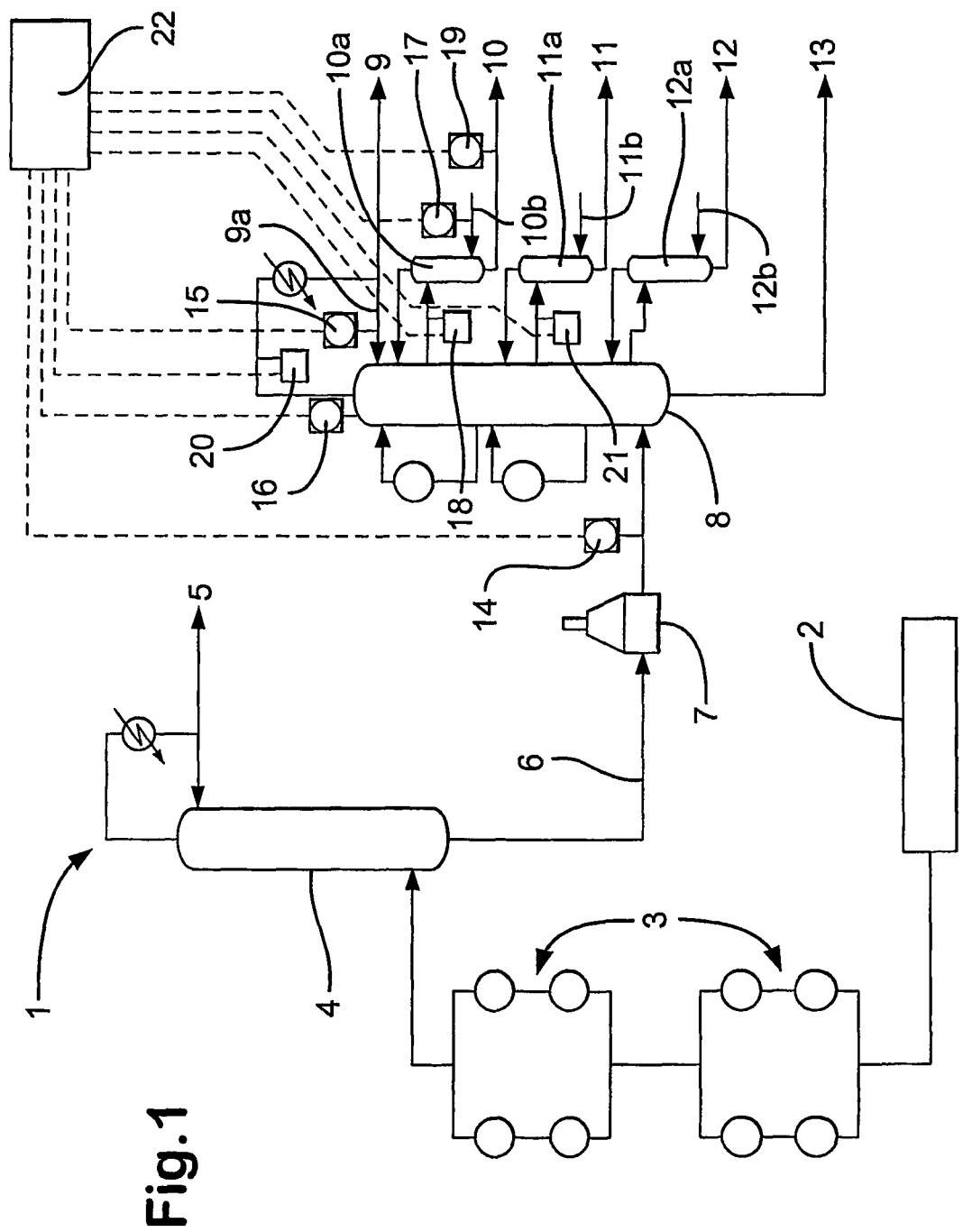
FIG. 1 is a schematic overview of the application of a process control method of the present invention to a crude oil distillation unit.

FIG. 1 shows a typical crude distillation unit 1. Crude oil in storage tank 2 is fed via preheat exchangers 3 to a preflash column 4. A gas-phase light fraction 5 is removed, and the remaining liquid is fed to a crude distillation tower 8 via heating furnace 7. In the crude distillation tower, the post-flashed crude oil is separated into a number of fractions, which are removed from the tower at various heights depending on their boiling point range. Illustrated here are naphtha 9, kerosene 10, diesel 11, gasoil 12 and a heavy atmospheric residue 13. Associated with side-drawn fractions 10 to 12 are reflux towers 10a-12a, where an overhead stream of relatively light components is fed back to the crude distillation tower. Associated with the reflux towers are heated steam supplies, 10b-12b. For the naphtha fraction, a portion 9a is removed and fed back to a position towards the top of the crude distillation tower 8.

Typically, there are in the region of 20 independent and 50 dependent variables associated with such a process, not all of which are shown in this example. Independent variables measured include the temperature of the crude after the furnace measured by temperature sensor 14, crude tower reflux flow measured by flow meter 15, crude tower pressure measured by pressure sensor 16, and kerosene stripper steam flow measured by flow meter 17. Examples of dependent variables include kerosene flash point measured by on-line analyser 18, kerosene draw temperature measured by temperature sensor 19, crude tower vapour temperature measured by temperature sensor 20, and diesel draw temperature measured by temperature sensor 21. All the sensors and meters are interfaced to DMC unit 22.

Figure 2:
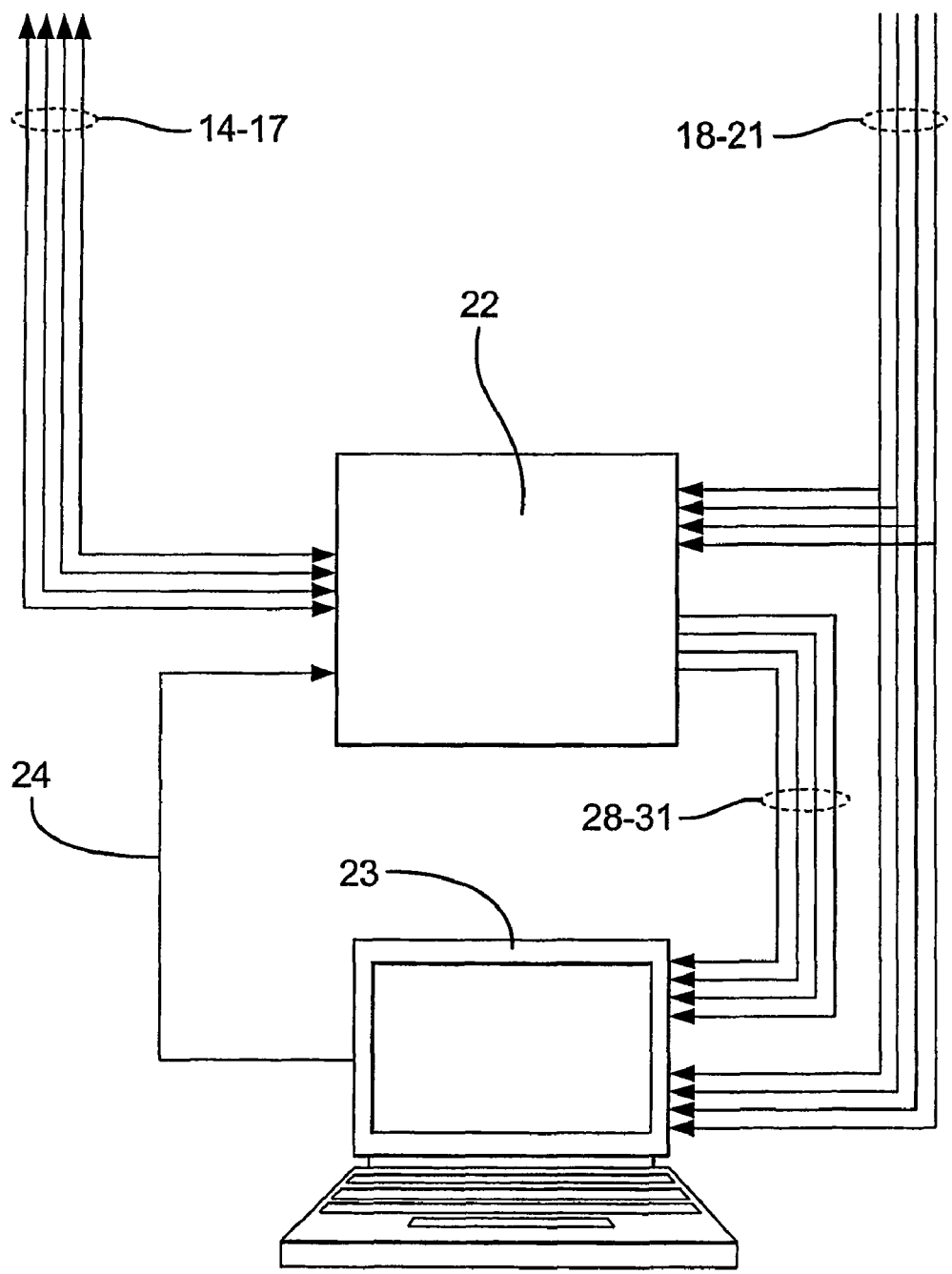
FIG. 2 schematically shows the interface between the sensors and meters of the crude distillation unit illustrated in FIG. 1 with a DMC unit and a computer programmed with PCA software.
Figure 3:
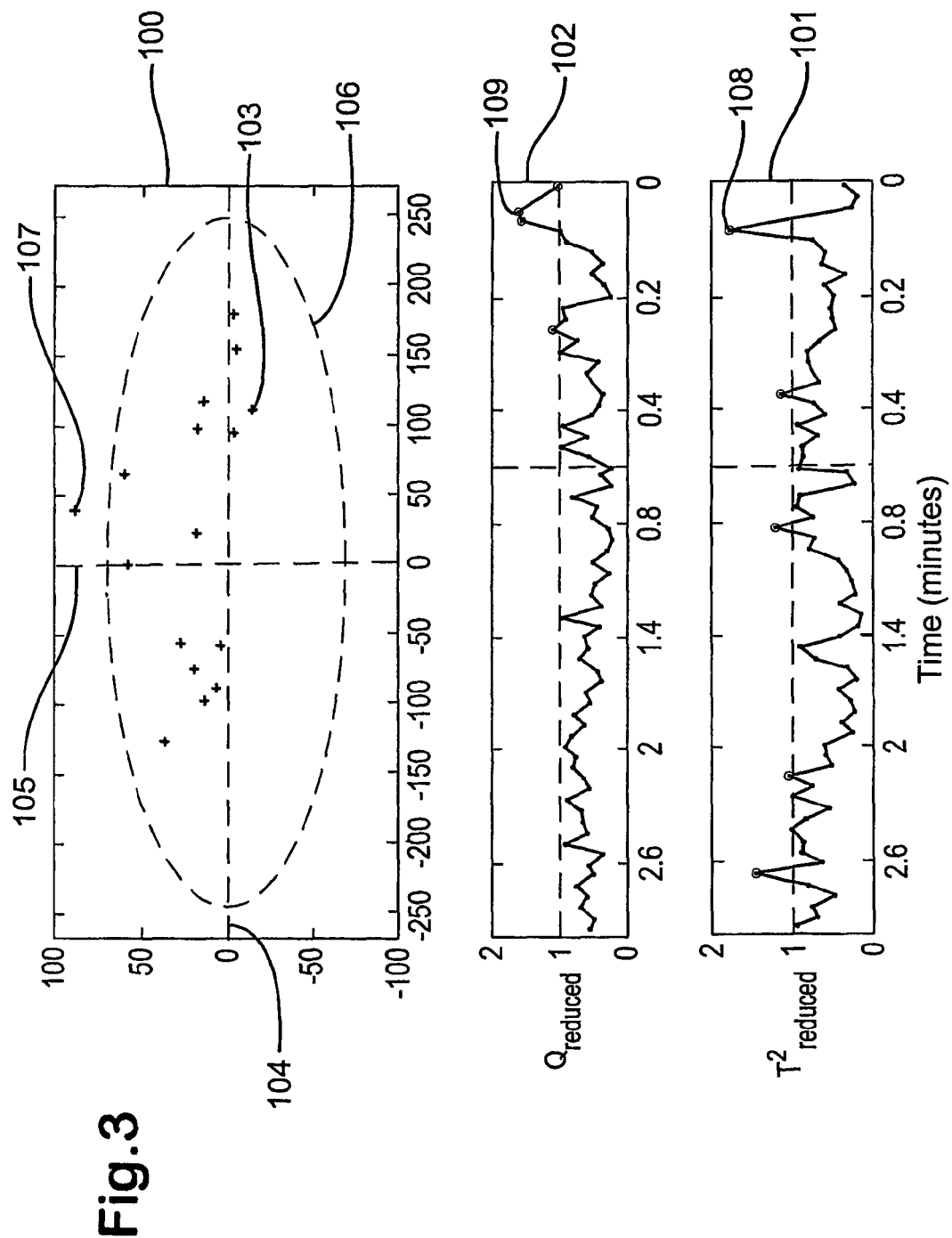
FIG. 3 shows a scores plot for the first two principal components, together with a $T^2$ plot and a Q-metric plot.
Figure 4:
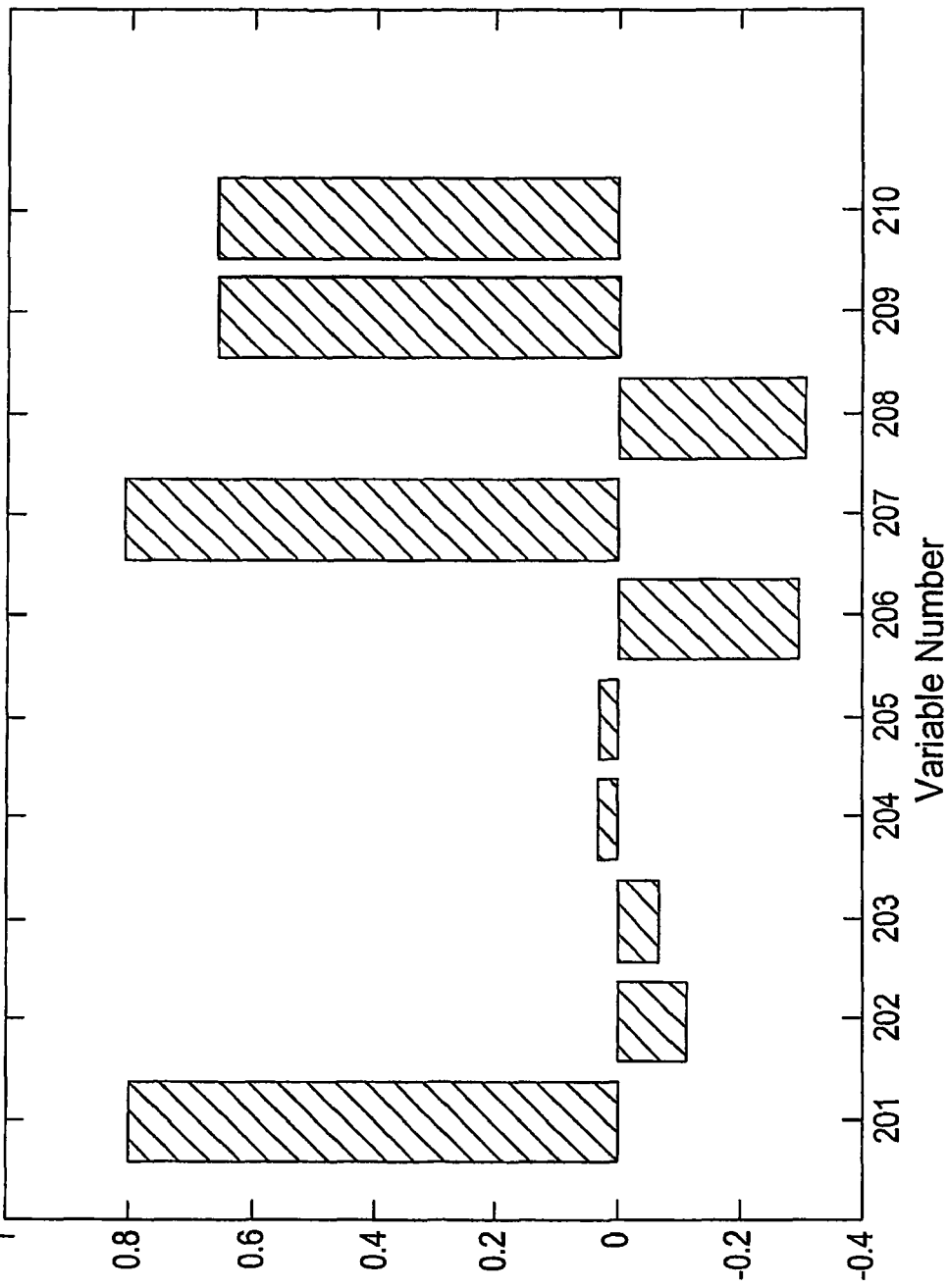
FIG. 4 shows a Q contribution plot of a scores data point.

FIG. 2 shows how the DMC unit output and sensor outputs are interfaced with a computer having principal component analysis software. The DMC 22 receives input from the independent variable sensors and meters (for example 14-17) of the crude distillation unit, and also from the dependent variable sensors and meters (for example 18-21). The DMC calculates the predicted values of the dependent variables (28-31) based on the independent variable values. The DMC can then alter the independent variables accordingly if necessary. Additionally, the predicted variables are also fed as output to a computer 23 having PCA software, which also receives the corresponding actual values of the dependent variables (for example 18-21) from the crude distillation unit. The PCA output can be viewed in a control room by an operator. Typical examples of how the PCA results are displayed are shown in FIGS. 3 and 4. In one embodiment of the invention, abnormal events can be detected automatically from the PCA, and fed back as output 24 to the DMC as an additional form of control.

FIG. 3 shows how, individually or in combination, a scores plot 100, a $T^2$ plot 101 and a Q-metric plot 102 can be used in real time to detect an abnormal event. In FIG. 3, the scores plot 100 is a cumulative plot showing the latest data point 103 in addition to previously collected data points, plotted against the first two principal components, 104 (PC1) and 105 (PC2). The position of the data point compared to a 95% confidence interval 106 provides an indication of whether the process is operating within the expected tolerances, or if an abnormal event is occurring. Trend plots of the $T^2$ value with time 101 and the Q value 102 with time are also shown. If a process upset or other abnormal event occurs, this can be indicated by one or more of an increase in the $T^2$ value, the Q-value increasing, and a scores value falling outside the pre-defined 95% confidence interval 106, as indicated for example by data point 107, which also corresponds with an increased $T^2$ value 108, and an increase in Q-value for subsequent data points 109.

When an abnormal event is detected, the outlying data point (or points) can be probed by a user. One way is to view a Q or $T^2$ contribution plot, as shown in FIG. 4, which provides information as to which variables are associated with the abnormal event. The plot in FIG. 4 shows a plot of the Q-contribution value (y-axis) for each of variables 201-210 against the first principal component for a scores data point falling outside the 95% confidence limit. Variables having high values have a high influence on the position of the data point along the specified principal component. In the example shown, the position of the scores data point in relation to the first principal component is heavily influenced in particular by variables 201, 207, 209 and 210. Variables 206 and 208 have moderate influence on the data point.

In an example of the application of the process of the present invention on the crude distillation unit 1, the flash point of the kerosene fraction, as measured by sensor 19, is an important parameter to measure, as kerosene is a major constituent of aviation fuel. The flash point must fall within a range of values (not too high so that combustion is inhibited, and not too low so that accidental ignition can occur), otherwise any aviation fuel blended there from may fall outside specifications and will be unfit for use.

If the Q-contribution identifies the flash point as a dependent variable associated with the abnormal event, this can indicate either that the kerosene composition has changed from that predicted, or it can indicate that the on-line analyser has failed. If no other variables are associated with the abnormal event, this indicates that there may be an analyser failure, and an off-line laboratory test can be performed to confirm whether the on-line analyser is at fault, or needs recalibration for example. Alternatively, if several other variables, such as the kerosene 18 and/or diesel draw temperature 19, are also responsible, this indicates that something associated with the kerosene composition may require operator intervention. This diagnosis can be performed in a matter of seconds, and allows a quick decision to be made, for example whether to divert aviation fuel derived from the kerosene to an off-specification tank if the composition is not optimal. Alternatively, if the problem lies with the analyser, production losses can be minimised by maintaining flow to the main product tank.

The invention claimed is:

1. A process control system for detecting abnormal events in a process having one or more independent variables and one or more dependent variables, which system comprises:
   means for measuring values of the one or more independent and dependent variables,
   a process control means comprising a predictive model for calculating predicted values of the one or more dependent variables from the measured values of the one or more independent variables,
   a means for calculating residual values for the one or more dependent variables from the difference between the predicted and measured values of the one or more dependent variables, and
   a means for performing a principal component analysis on the residual values,
   wherein the process control means is a multivariable predictive control means and the principal component analysis results in the output of one or more scores values, T2 values and Q values, an abnormal event being identified from one or more thereof, and wherein the Q or T2 contributions of a data point associated with an abnormal event are compared to a database of Q or T2 contributions associated with known abnormal events in order to identify the onset of a known abnormal event.

2. A system as claimed in claim 1, in which the process control means is a dynamic matrix control system.

3. A system as claimed in claim 1, which additionally comprises a means for applying a correction to the predicted values of one or more of the dependent variables or residuals to account for mismatch between the predicted and measured values of the dependent variables in the absence of an abnormal event.

4. A system as claimed in claim 1, in which the means for calculating the residual values and/or the means for performing a principal components analysis on the residual values and/or the means for applying a correction to the one or more predicted dependent variable values or residuals values is a programmed computer.

5. A system as claimed in claim 1, in which the results of the principal components analysis are fed back to the process control means.

6. A system as claimed in claim 5, in which corrective action associated with an identified abnormal event is automatically fed to the process control means.

7. A system as claimed in claim 1, in which the process control means has more than one predictive model for different stable modes of operation of the process.

8. A system as claimed in claim 1, in which the process is a refinery process.

9. A system as claimed in claim 8, in which the refinery process is the distillation of crude oil.

10. A method for detecting abnormal events in a process, which process comprises one or more independent variables and one or more dependent variables, wherein the method is performed using a process control system comprising means for measuring values of the one or more independent and dependent variables, and a process control means comprising a predictive model for calculating predicted values of the one or more dependent variables from the measured values of the one or more independent variables, which method comprises:

measuring values of the one or more independent variables and the one or more dependent variables, calculating predicted values of the one or more dependent variables from the measured values of the one or more independent variables, calculating residual values for the one or more dependent variables from the differences between the predicted and measured values of the one or more dependent variables, and performing a principal component analysis on the residual values, wherein the process control means is a multivariable predictive control means and the principal component analysis results in the output of one or more scores values, T2 values and Q values, an abnormal event being identified from one or more thereof, and wherein the Q or T2 contributions of a data point associated with an abnormal event are compared to a database of Q or T2 contributions associated with known abnormal events in order to identify the onset of a known abnormal event.

11. A method as claimed in claim 10, in which the process comprises a process control system.

12. A method as claimed in claim 10, in which the process is a refinery process.

13. A method as claimed in claim 12, in which the abnormal event is associated with the flash point of a fraction derived from a crude oil distillation tower.

14. A method as claimed in claim 13, in which the fraction is kerosene.

15. A process control system for detecting abnormal events in a process having one or more independent variables and one or more dependent variables, which system comprises:

measuring device for measuring values of the one or more independent and dependent variables, a process controller comprising a predictive model for calculating predicted values of the one or more dependent variables from the measured values of the one or more independent variables, a calculator for calculating residual values for the one or more dependent variables from the difference between the predicted and measured values of the one or more dependent variables, and an analyzer for performing a principal component analysis on the residual values, wherein the process controller is a multivariable predictive controller and the principal component analysis results in the output of one or more scores values, T2 values and Q values, an abnormal event being identified from one or more thereof, and wherein the Q or T2 contributions of a data point associated with an abnormal event are compared to a database of Q or T2 contributions associated with known abnormal events in order to identify the onset of a known abnormal event.

\* \* \* \* \*